United States Patent
Lei et al.

(10) Patent No.: US 12,167,280 B2
(45) Date of Patent: Dec. 10, 2024

(54) METHOD AND APPARATUS FOR RESOURCE ALLOCATION FOR EMBB/URLLC

(71) Applicant: LENOVO (BEIJING) LIMITED, Beijing (CN)

(72) Inventors: Haipeng Lei, Beijing (CN); Zhi Yan, Beijing (CN); Xiaodong Yu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 401 days.

(21) Appl. No.: 17/619,415

(22) PCT Filed: Jun. 28, 2019

(86) PCT No.: PCT/CN2019/093860
§ 371 (c)(1),
(2) Date: Dec. 15, 2021

(87) PCT Pub. No.: WO2020/258294
PCT Pub. Date: Dec. 30, 2020

(65) Prior Publication Data
US 2022/0264377 A1    Aug. 18, 2022

(51) Int. Cl.
*H04W 28/26* (2009.01)
*H04L 5/00* (2006.01)

(52) U.S. Cl.
CPC ........... *H04W 28/26* (2013.01); *H04L 5/0048* (2013.01)

(58) Field of Classification Search
CPC ..... H04W 28/26; H04W 72/23; H04W 72/51; H04W 72/0453; H04W 72/04;
(Continued)

(56) References Cited

U.S. PATENT DOCUMENTS

2009/0190675 A1* 7/2009 Ling .................. H04L 27/2675
370/350
2019/0069271 A1* 2/2019 Reial ..................... H04W 68/02
(Continued)

FOREIGN PATENT DOCUMENTS

| CN | 104125644 A | 10/2014 |
|---|---|---|
| CN | 107197524 A | 9/2017 |

(Continued)

OTHER PUBLICATIONS

International Searching Authority, "Written Opinion of the International Searching Authority," PCT/CN2019/093860, Mar. 23, 2020, pp. 1-3.
(Continued)

*Primary Examiner* — Kiet Tang
(74) *Attorney, Agent, or Firm* — Kunzler Bean & Adamson

(57) ABSTRACT

The present application is related to a method and apparatus for resource allocation for EMBB/URLLC in 3GPP 5G technology. A method for resource allocation performed by a base station (BS) includes: transmitting, to a user equipment (UE), signaling indicating non-available resource on a carrier, wherein the non-available resource is reserved for a specific type of communication; and transmitting, to the UE, an indicator indicating allocated resource for transmitting data on the carrier, wherein the allocated resource includes at least part of the non-available resource.

19 Claims, 8 Drawing Sheets

(58) Field of Classification Search
CPC ..... H04L 5/0048; H04L 5/001; H04L 5/0073; H04L 5/0044; H04L 5/0094; H04L 1/1614; H04L 27/2675
See application file for complete search history.

(56) References Cited

U.S. PATENT DOCUMENTS

| | | | |
|---|---|---|---|
| 2019/0260510 A1* | 8/2019 | Lin | H04W 72/04 |
| 2021/0281371 A1* | 9/2021 | Wei | H04L 1/1614 |

FOREIGN PATENT DOCUMENTS

| | | |
|---|---|---|
| CN | 107888350 A | 4/2018 |
| WO | 2015038647 A2 | 3/2015 |

OTHER PUBLICATIONS

Qualcomm Incorporated, Coexistence of NVB-IoT with NR, 3GPP TSG-RAN WG1 #94, R1-1809034, Aug. 20-24, 2018, pp. 1-4, Gothenburg, Sweden.

Nokia, Nokia Shanghai Bell, Coexistence of eMTC with NR, 3GPP TSG RAN WG1 Meeting #97, R1-1906704, May 13-17, 2019, pp. 1-5, Reno, USA.

ZTE, ZTE Microelectronics, Considerations on NR spectrum utilization and guard band using fractional PRB, 3GPP TSG-RAN WG4 NR AH Meeting, R4-1700009, Jan. 17-19, 2017, pp. 1-11, Spokane, Washington.

Ericsson, On NB-IoT, eMTC and NR coexistence, 3GPP TSG RAN1#88, R1-1703866, Apr. 13-17, 2017, pp. 1-10, Athens, Greece.

* cited by examiner

METHOD AND APPARATUS FOR RESOURCE ALLOCATION FOR EMBB/URLLC

TECHNICAL FIELD

Embodiments of the present application generally relate to in 3rd Generation Partnership Project (3GPP) 5G wireless communication technology, especially to technology for resource allocation for enhanced mobile broadband/ultra-reliability low-latency communication (EMBB/URLLC).

BACKGROUND

In 3GPP Release 17, 5G New Radio (NR) based Internet of Things (IoT) application is targeted to address new use cases with IoT-type requirements that cannot be met by LTE enhanced machine type communication (eMTC) application and LTE Narrow Band (NB)-IoT application. For example, IoT-type requirements include low-complexity, enhanced coverage, long battery life, massive number of devices, higher data rate and/or lower latency. 3GPP 5G NR-IoT application aims to satisfy some of these requirements that cannot be achieved by LTE eMTC application and LTE NB-IoT application. Given this, technologies of resource allocation for EMBB/URLLC with in-band NR-IoT are developed.

SUMMARY

Some embodiments of the present application provide a method for wireless communications performed by a base station (BS). The method includes transmitting, to a user equipment (UE), signaling indicating non-available resource on a carrier, wherein the non-available resource is reserved for a specific type of communication; and transmitting, to the UE, an indicator indicating allocated resource for transmitting data on the carrier, wherein the allocated resource includes at least part of the non-available resource.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a BS.

Some embodiments of the present application provide a method for wireless communications performed by a UE. The method includes receiving, from a BS, signaling indicating non-available resource on a carrier, wherein the non-available resource is reserved for a specific type of communication; and receiving, from the BS, an indicator indicating allocated resource for transmitting data on the carrier, wherein the allocated resource includes at least part of the non-available resource.

Some embodiments of the present application provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
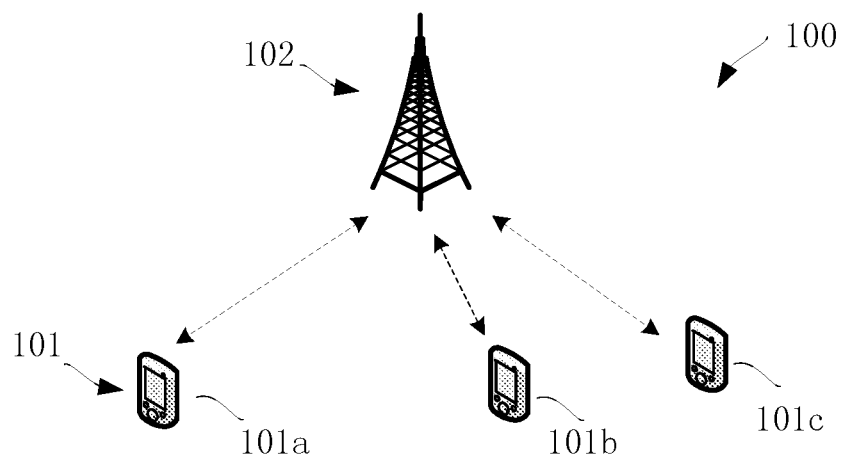
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, a wireless communication system 100 includes at least one user equipment (UE) 101 and at least one base station (BS) 102. In particular, the wireless communication system 100 includes three UEs 101 (e.g., UE 101a, UE 101b, and UE 101c) and one BS 102 for illustrative purpose. Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

In some embodiments of the present application, each of the UE(s) 101 may be have deployed an IoT application, a eMBB application and/or an URLLC application. For instance, UE 101a may implement the IoT application and may be named as an IoT UE, while UE 101b and UE 101c may implement the eMBB application and/or the URLLC application and may be named as a eMBB UE, an URLLC UE, or a eMBB/URLLC UE. It is contemplated that the specific type of application(s) deployed in the UE(s) 101 may be varied and not limited.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BSs 102 transmit data using an OFDM modulation scheme on the DL and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS 102 may communicate with the UE 101 using the 3GPP 5G protocols.

In 3GPP LTE eMTC protocol, the physical layer channel design is based on the bandwidth of 1.4 MHz, because 1.4 MHz is the minimum supported LTE bandwidth. With the minimum bandwidth of 1.4 MHz, an eMTC device may greatly reduce cost and an implementation complexity. The 1.4 MHz bandwidth includes 6 PRBs, wherein LTE Primary synchronization signal (PSS), Secondary synchronization signal (SSS), and Physical broadcast channel (PBCH) are accommodated in these 6 PRBs. Hence, a UE with 1.4 MHz bandwidth capability can access a wideband carrier with a bandwidth larger than 1.4 MHz. Furthermore, to exploit frequency diversity gain, a UE with 1.4 MHz bandwidth capability can dynamically change its operating bandwidth from one subband to another subband, wherein each subband has a bandwidth of 1.4 MHz.

In 3GPP NR Release 17, the minimum bandwidth is defined as 5 MHz. PSS, SSS and PBCH are designed to occupy 20 resource blocks (RBs) regardless of the subcarrier spacing. Therefore, for NR IoT application, if the minimum bandwidth is smaller than 5 MHz with a 15 kHz subcarrier spacing, or if the minimum bandwidth is smaller than 10 MHz with a 30 kHz subcarrier spacing, it is inevitable to redesign new PSS/SSS/PBCH, which leads to huge standardization efforts. Thus, 5 MHz should be the minimum bandwidth for NR IoT application for subcarrier spacing of 15 kHz. In addition, 10 MHz should be the minimum bandwidth for NR IoT application for subcarrier spacing of 30 kHz.

Generally, compared to LTE, NR achieves higher frequency utilization efficiency. In TS38.101, the maximum number of available resource blocks (RBs) for each combination of subcarrier spacing and carrier bandwidth for FR1 is listed in Table 5.3.2-1 of TS38.101, wherein the maximum number of available RBs depends on the subcarrier spacing and carrier bandwidth. For example, as specified in TS38.101, the maximum number of available RBs for a 5 MHz bandwidth capability with a 15 kHz subcarrier spacing is 25; the maximum number of available RBs for a 10 MHz bandwidth capability with a 30 kHz subcarrier spacing is 24; and the maximum number of available RBs for 20 MHz bandwidth capability with a 15 kHz subcarrier spacing is 106.

Still, the guard band is necessary to avoid the interference between adjacent carriers. Table 5.3.3-1 of TS38.101 further defines an equation for calculating the minimum guard bands. For instance, the minimum guard band for a 5 MHz bandwidth capability with a 15 kHz subcarrier spacing is 242.5 kHz; the minimum guard band for a 10 MHz bandwidth capability with a 30 kHz subcarrier spacing is 665 kHz; and the minimum guard band for 20 MHz bandwidth capability with a 15 kHz subcarrier spacing is 452.5 kHz.

There are two guard bands on each side of 25 RBs of a 5 MHz carrier bandwidth using a 15 kHz subcarrier spacing. Since an RB is 180 kHz and each guard band is at least 242.5 kHz for subcarrier spacing of 15 kHz and a 5 MHz carrier bandwidth, at least 2 RBs are needed to accommodate 242.5 kHz guard band. In that sense, 2 RBs are left empty as guard band on each side. For a 10 MHz carrier bandwidth with a 30 kHz subcarrier spacing, an RB is 360 kHz. Thus, the guard band of 665 kHz is achieved by 2 RBs. Therefore, 2 RBs are left empty as guard band. When NR IoT is deployed with a 5 MHz carrier bandwidth or a 10 MHz carrier bandwidth, there are a certain RBs left empty as guard band on each side of the 5 MHz carrier bandwidth or the 10 MHz carrier bandwidth.

However, this kind of NR IoT deployment may lead to some issues on existing resource allocation for an eMBB/URLLC transmission. In NR Release 15, two resource allocation types are specified for frequency domain resource allocation indication: Type 0 is a bitmap-based indication with each bit of the bitmap indicating a resource block group (RBG); and Type 1 is a RIV-based indication with contiguous PRB allocation.

Generally, resource allocation Type 0 supports both contiguous and non-contiguous PRB allocation and has scheduling granularity per RBG. Resource allocation Type 1 can support only contiguous PRB allocation. In detail, for resource allocation of Type 0, the resource block assignment information in a downlink control information (DCI) includes a bitmap indicating the RBGs that are allocated to the scheduled UE, wherein a RBG is a set of consecutive virtual resource blocks defined by higher layer parameter rbg-Size configured by PDSCH-Config and the size of the carrier bandwidth part as defined in Table 5.1.2.2.1-1 of TS38.101. For instance, Table 5.1.2.2.1-1 specifies that regarding Bandwidth Part Size "73-144," Configuration 1 for nominal RBG size P is 8, while Configuration 2 for nominal RBG size P is 16. In other words, if there are 73-144 RBs in a bandwidth, one RBG includes 8 RBs for Configuration 1 or 16 RBs for Configuration 2, respectively.

Existing NR UE costs in terms of implementation, complexity, and power consumption are very high. For example, a NR UE may require 100 bandwidth for FR1 or 200 MHz bandwidth for FR2, at least 2 Rx antennas or 4 Rx antennas, dynamic Time Division Duplexing (TDD), 15 kHz, 30 kHz, or 60 kHz subcarrier spacing (SCS) for FR1, no always-on signals, and etc. Thus, it is necessary to tailor the existing NR features in terms of cost, implementation complexity and power consumption for NR IoT use cases. In addition, existing NR coverage may not meet requirements of NR IoT application. Hence, coverage enhancement for NR IoT application is also necessary.

Basically, a BS may avoid interference between eMBB/URLLC applications and IoT application on guard bands by means of not scheduling a Resource Block Group(s) (RBG(s)) that overlap with a carrier bandwidth of the IoT application. However, such solution may cause resource waste, especially when there are sixteen PRBs within one RBG in total, but only one PRB within the RBG overlaps with the carrier bandwidth of the IoT application, while other fifteen PRBs within the same RBG do not overlap with the carrier bandwidth of the IoT application.

Embodiments of the present application aim to provide solutions for resource allocation for a wideband carrier, so as to further improve channel utilization efficiency and avoid potential interference between eMBB/URLLC and IoT applications. More details on embodiments of the present application will be illustrated in the following text in combination with the appended drawings.

Figure 2:
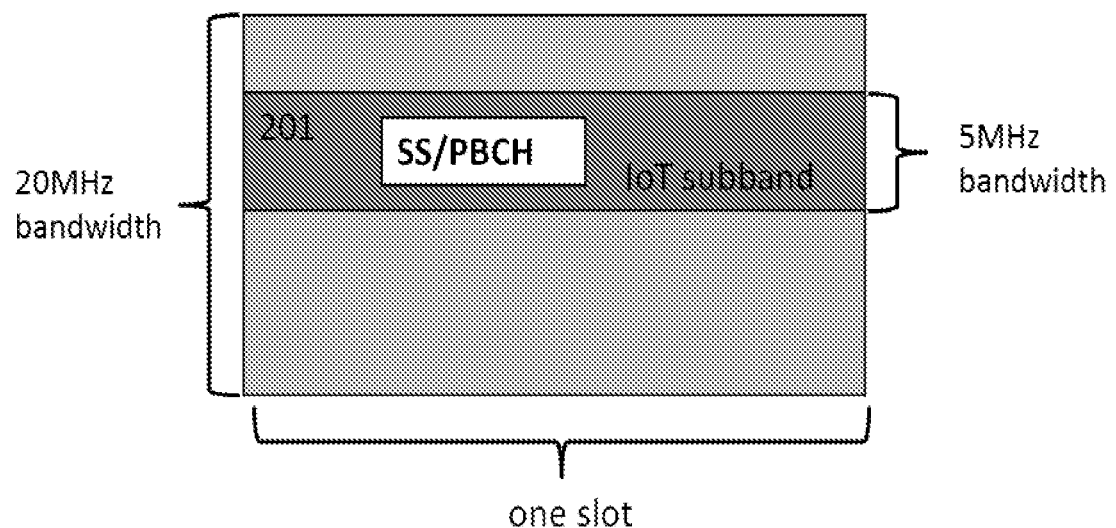
FIG. 2 illustrates an exemplary IoT subband deployment in accordance with some embodiments of the present application.

FIG. 2 illustrates an exemplary IoT subband deployment in accordance with some embodiments of the present application. The embodiments of FIG. 2 deploy NR IoT application in a wideband carrier within one slot. As shown in FIG. 2, a wideband carrier of a 20 MHz bandwidth within one slot is used to deploy NR IoT application, eMBB application, and/or URLLC application. For example, subband 201 with a 5 MHZ bandwidth is used to deploy NR IoT application as shown in FIG. 2.

A synchronization signal (SS)/PBCH block is also named as SSB or NR SSB. In some embodiments, SSB may be transmitted using a 15 kHz subcarrier spacing and occupies 20 RBs in the frequency domain. When NR IoT application is deployed, a simple way is to reuse the existing SSB and an initial access procedure for IoT UE, such that the IoT UE can access the channel. Accordingly, the IoT UE should have a minimum 5 MHz bandwidth capability with a 15 kHz subcarrier spacing or a minimum 10 MHz bandwidth capability with a 30 kHz subcarrier spacing, in order to reuse the existing NR SSB to access the channel, without designing a new SSB.

In the embodiments of FIG. 2, assuming a 5 MHz bandwidth having a 15 kHz subcarrier spacing is used for NR IoT application, the IoT UE will search the SSB (i.e., SS/PBCH block) according to sync raster and the given frequency band. After the IoT UE finishes the initial access procedure, the IoT UE may transmit or receive signals on the 5 MHz bandwidth having a 15 kHz subcarrier spacing. From the perspective of this IoT UE, it is working on a carrier with 5 MHz bandwidth.

Please refer to FIG. 2. For the whole 20 MHz carrier bandwidth, there are 106 RBs in case of a 15 kHz subcarrier spacing, as defined in Table 5.3.2-1 of TS38.101. Correspondingly, the RBG size is 8 in Configuration 1 or 16 in Configuration 2 according to Table 5.1.2.2.1-1 of TS38.214. When one RBG includes one or more RBs that are intentionally left empty as guard band(s) for the 5 MHz carrier bandwidth of NR IoT application, and the RBG is assigned to eMBB/URLLC UE, this eMBB/URLLC UE does not know which RB(s) within the RBG it should not use for UL transmission, or cannot know around which RB(s) within the RBG it should assume DL transmission using rate-matching. Obviously, interference(s) may be caused between the eMBB/URLLC UE and the IoT UE in the guard band(s).

For simplicity, a BS (e.g., BS 102 as shown in FIG. 1) can avoid this interference(s) by not scheduling the RBG(s) which overlap with the carrier bandwidth for NR IoT application. However, this may lead to resource waste especially when there is only one PRB of the RBG that overlaps with IoT carrier bandwidth. For instance, for a 20 MHz bandwidth of Configuration 2, one RBG includes 16 PRBs. If only the upmost or the bottommost PRB of the RBG overlaps with IoT carrier bandwidth, the other 15 PRBs within the RBG are wasted.

Furthermore, to exploit frequency diversity gain, NR IoT may perform frequency hopping in a unit of minimum IoT bandwidth, e.g., a 5 MHz bandwidth. After an initial access procedure, IoT UE (e.g., UE 101a as shown in FIG. 1) or IoT BS (e.g., BS 102 as shown in FIG. 1) may hop from one 5

MHz bandwidth to another 5 MHz bandwidth. Such frequency hopping is similar to LTE eMTC application. This kind of frequency hopping may result in dynamic guard bands in frequency domain, which makes the interference(s) more variable or dynamic, if there is no solution to avoid the potential interference(s) between eMBB/URLLC UE and IoT UE in the guard bands.

Figure 3:
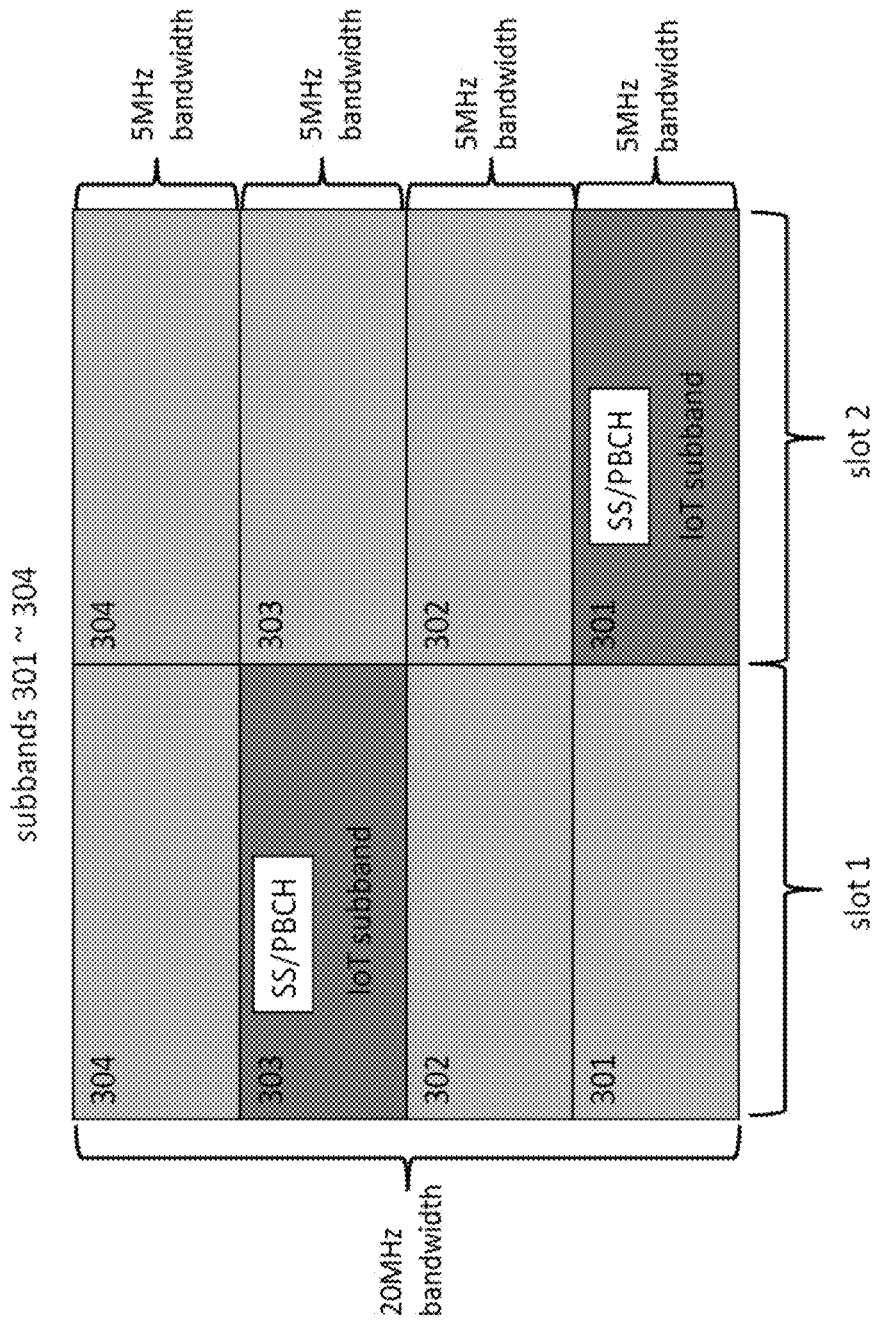
FIG. 3 illustrates another exemplary IoT subband deployment in accordance with some embodiments of the present application.

FIG. 3 illustrates another exemplary IoT subband deployment in accordance with some embodiments of the present application. The embodiments of FIG. 3 provide information indicating guard band(s) based on subband(s) on a carrier. Radio Resource Control (RRC) signaling may be used to configure the subband size and corresponding subcarrier spacing to eMBB/URLLC UE. Based on the NR IoT bandwidth, eMBB/URLLC UE knows how to partition the wideband carrier into subbands. Furthermore, based on the NR IoT subcarrier spacing, eMBB/URLLC UE knows how many PRBs on each side of a subband are reserved as guard bands when this subband is used to deploy NR IoT application.

In some embodiments of the present application, the NR IoT bandwidth is fixed to 5 MHz and the subcarrier spacing for NR IoT bandwidth is fixed to 15 kHz. In some other embodiments, the NR IoT bandwidth is fixed to 10 MHz and the subcarrier spacing for NR IoT bandwidth is fixed to 30 kHz. In some additional embodiments, the NR IoT bandwidth is configurable among 2.5 MHz, 5 MHz, 10 MHz, 15 MHz, 20 MHz or other bandwidths, and the subcarrier spacing of the NR IoT bandwidth is configurable between 15 kHz, 30 kHz or other values.

Specifically, according to embodiments of FIG. 3, a wideband carrier of 20 MHz bandwidth is partitioned into 4 subbands, i.e., subbands 301~304, and each subband has a bandwidth that equals to NR IoT bandwidth, i.e., a 5 MHz bandwidth. These subbands are used to deploy NR IoT application, eMBB application, and/or URLLC application. For example, subband 303 within slot 1 and subband 301 within slot 2 include SS/PBCH blocks are used to deploy NR IoT application as shown in FIG. 3. Each of subband 303 within slot 1 and subband 301 within slot 2 may be named as IoT subband or NR IoT subband. IoT UE (e.g., UE 101a as shown in FIG. 1) or IoT BS (e.g., BS 102 as shown in FIG. 1) may hop from subband 303 within slot 1 to subband 301 within slot 2.

In some embodiments of the present application, a new field is introduced in DCI for indicating to the eMBB/URLLC UE a location of a subband where NR IoT application is deployed. For example, DCI for scheduling PDSCH or DCI for scheduling PUSCH may include a new field to indicate a location of a subband in which NR IoT application is deployed. After receiving such DCI, the eMBB/URLLC UE may identify the NR IoT subband location. With this NR IoT subband location, with a predefined subband size and subcarrier spacing, the eMBB/URLLC UE may know a concrete number of PRBs which should be reserved as guard band(s) on each side of the NR IoT subband (e.g., subband 303 within slot 1 and subband 301 within slot 2 as shown in FIG. 3).

Several embodiments of the present application provide details for signaling indicating the NR IoT subband location.

In some embodiments of the present application, assuming a wideband carrier include N subbands in total, an N-bit bitmap is included in DL grant or UL grant, to indicate the NR IoT subband location, wherein each bit in the N-bit bitmap corresponds to one subband of the N subbands and indicates whether the subband is available or non-available for transmission. Upon reception of this DCI, eMBB/URLLC UE shall derive which subband is used for NR IoT application.

In particular, according to embodiments of FIG. 3, a wideband carrier of 20 MHz bandwidth is partitioned into four subbands, and thus at least one of DL grant and UL grant may include a 4-bit bitmap, to indicate the NR IoT subband location. Upon reception of the DCI including this 4-bit bitmap of '0010' in slot 1 corresponding to four subbands in slot 1 (e.g., subbands 301~304 within slot 1 as shown in FIG. 3), eMBB/URLLC UE may derive that subband 303 in slot 1 is used for NR IoT application.

Similarly, according to embodiments of FIG. 3, upon reception of the DCI including this 4-bit bitmap of '1000' in slot 2 corresponding to four subbands in slot 2 (e.g., subbands 301~304 within slot 2 as shown in FIG. 3), eMBB/URLLC UE may derive that subband 301 in slot 2 is used for NR IoT application.

In some additional embodiments of the present application, assuming a wideband carrier within one slot include N subbands in total, an N-bit bitmap is included in a group-common PDCCH, to indicate the NR IoT subband location. For example, DCI format 2_0, DCI format 2_1, or a new group-common DCI format may include the N-bit bitmap. Upon reception of this group-common PDCCH, eMBB/URLLC UE shall derive which subband is used for NR IoT application. According to embodiments of FIG. 3, a group-common PDCCH may include the 4-bit bitmap corresponding to subbands 301~304 in slot 1 or the 4-bit bitmap corresponding to subbands 301~304 in slot 2. After receiving the 4-bit bitmap in the group-common PDCCH, the eMBB/URLLC UE may derive that the subband 303 in the slot 1 or the subband 301 in the slot 2 is used for NR IoT application.

In some further embodiments of the present application, assuming only one subband is used for NR IoT application in a given slot on a given carrier and assuming a wideband carrier within one slot includes N subbands in total, there are N possible locations for the IoT subband. A field with ceil(log 2(N)) bits is enough to indicate which subband is used for NR IoT application. In some embodiments, this field is included in a specific DCI (e.g., DL grant or UL grant) transmitted to eMBB/URLLC UE; and in additional embodiments, this field is included in group-common PDCCH (e.g., DCI format 2_0, DCI format 2_1, or a new group-common DCI format) transmitted to eMBB/URLLC UE.

In some embodiments of the present application, considering not all slots are used for NR IoT application, in the DL grant or UL grant, a reserved state of the field indicating NR IoT subband location may be used to indicate that there is no NR IoT subband in a given slot for DL or UL transmission. If group-common PDCCH is used to indicate the NR IoT subband location, a reserved state of the field indicating NR IoT subband may be used to indicate that there is no NR IoT subband in a given slot(s), wherein whether the given slot(s) represents a given slot or given slots depends on the configured group-common PDCCH monitoring period.

Figure 4:
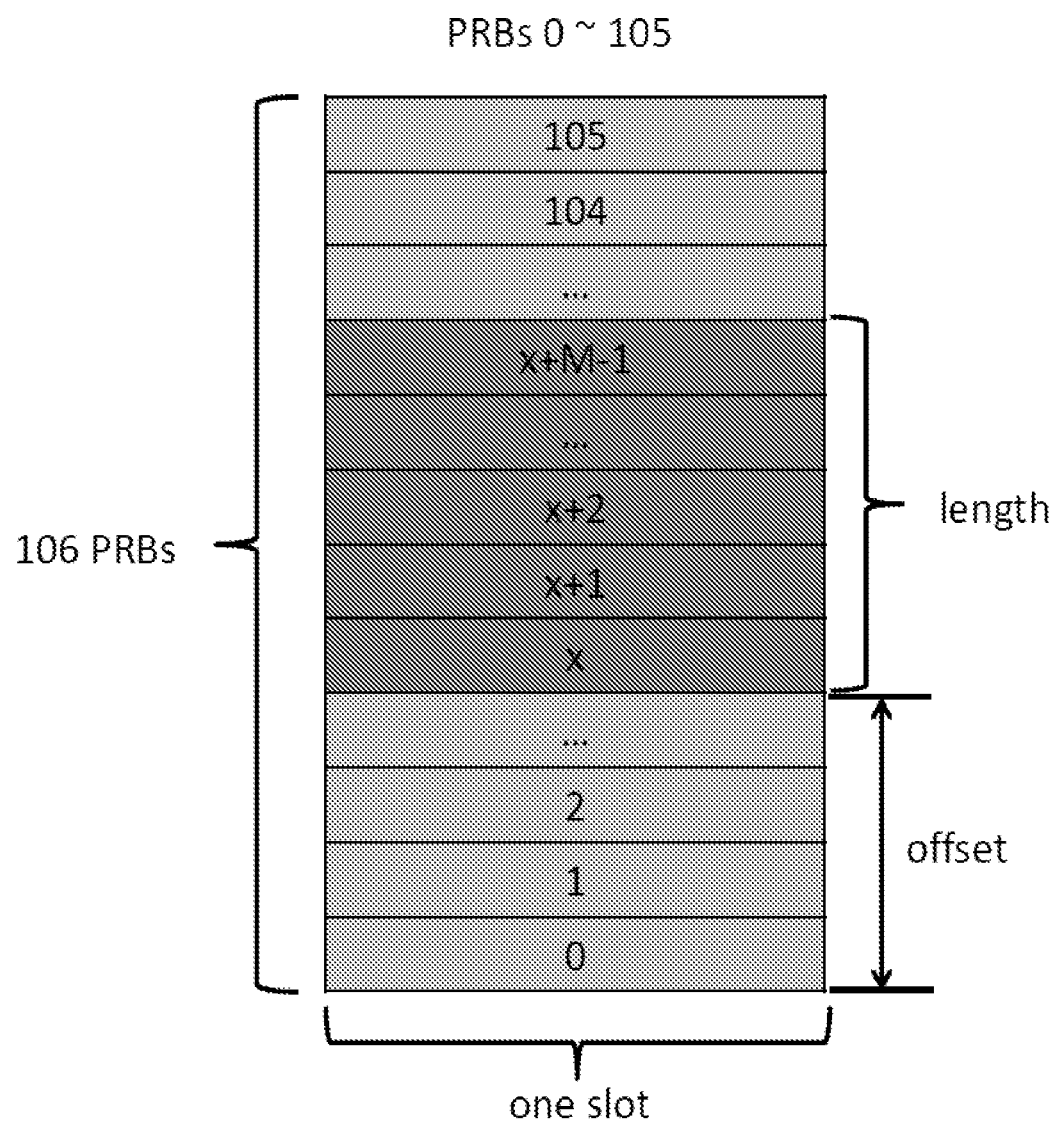
FIG. 4 illustrates an exemplary Physical Resource Block (PRB) deployment in accordance with some embodiments of the present application.

FIG. 4 illustrates an exemplary Physical Resource Block (PRB) deployment in accordance with some embodiments of the present application. According to the embodiments of FIG. 4, a wideband carrier within one slot is partitioned into 106 PRBs, i.e., PRBs 0~105.

In particular, for a 5 MHz bandwidth with a 15 kHz subcarrier spacing, two PRBs are necessary as guard band on each side of a NR IoT subband; and if only one 5 MHz carrier bandwidth is used by NR IoT application in a given slot on a wideband carrier, 29 PRBs in total (25 PRBs as listed in Table 5.3.2-1 of TS38.101+4 PRBs in guard bands) are not available for eMBB/URLLC transmission. For 10 MHz bandwidth with a 30 kHz subcarrier spacing, two PRBs are also necessary as guard band on each side of a NR IoT subband; and if only one 10 MHz bandwidth carrier is used by NR IoT application in a given slot on a wideband carrier, 28 PRBs in total (24 PRBs as listed in Table 5.3.2-1 of TS38.101+4 PRBs in guard bands) are not available for eMBB/URLLC transmission.

From a perspective of an eMBB/URLLC UE, it is only necessary to know which PRBs are not available for an eMBB/URLLC transmission. Thus, a starting PRB index and a concrete number of contiguous PRBs are enough to indicate the non-available PRBs. The non-available PRBs may include PRBs for IoT transmission and PRBs in guard bands, and all the PRBs for IoT transmission and guard bands are contiguous in frequency domain. Several embodiments of the present application provide details for signaling indicating non-available contiguous PRBs to the eMBB/URLLC UE, as follows.

In some embodiments of the present application, a new field is included in a DCI may be used to indicate non-available contiguous PRBs to the eMBB/URLLC UE. For example, an indicator in the DCI is used to indicate non-available contiguous PRBs. Specifically, an indicator is included in the DCI for scheduling PDSCH, the DCI for scheduling PUSCH, or a group-common PDCCH, to indicate non-available contiguous PRBs to the eMBB/URLLC UE. The indicator in the DCI may indicate both a starting PRB index of non-available contiguous PRBs and a concrete number of the non-available contiguous PRBs. After receiving the indicator in the DCI, the eMBB/URLLC UE may identify non-available contiguous PRBs.

In some embodiments of the present application, RRC signaling and DCI are combined to indicate non-available contiguous PRBs to the eMBB/URLLC UE. For example, a new field is included in DCI only indicating a starting PRB index of non-available contiguous PRBs, and RRC signaling is used to configure a concrete number of the non-available contiguous PRBs to the eMBB/URLLC UE. The new field may be included in the DCI for scheduling PDSCH, the DCI for scheduling PUSCH, or a group-common PDCCH. For instance, this new field in the DCI indicates a starting PRB index of the non-available contiguous PRBs. This new field in the DCI may indicate an offset from the first PRB of the wideband carrier within one slot.

More specifically, as shown in FIG. 4, PRB x to PRB x+M−1 within PRBs 0~105 are deployed NR IoT application, i.e., M contiguous PRBs in total are used by NR IoT application. According to the embodiments as described above, the new field in DCI may indicate an offset from PRB 0 (i.e., x) in a wideband carrier within the slot, or indicate a starting PRB index (i.e., PRB x) of the non-available contiguous PRBs; while RRC signaling transmits length from PRB x to PRB x+M−1 (i.e., M), to indicate a concrete number of the non-available contiguous PRBs to eMBB/URLLC UE.

In some embodiments of the present application, RRC signaling is used to indicate non-available contiguous PRBs to eMBB/URLLC UE. For example, RRC signaling is used to configure both a starting PRB index and a concrete number of non-available contiguous PRBs to eMBB/URLLC UE. No field in DCI is needed in these embodiments. Alternatively, DCI indicates the existence of the non-available PRBs, e.g., one bit set to "1" in the DCI is used to indicate the RRC configured non-available PRBs are not available in the scheduled slot, one bit set to "0" in the DCI is used to indicate the RRC configured non-available PRBs are available in the scheduled slot. These embodiments are only applicable for non-frequency hopping case for NR IoT application.

Figure 5:
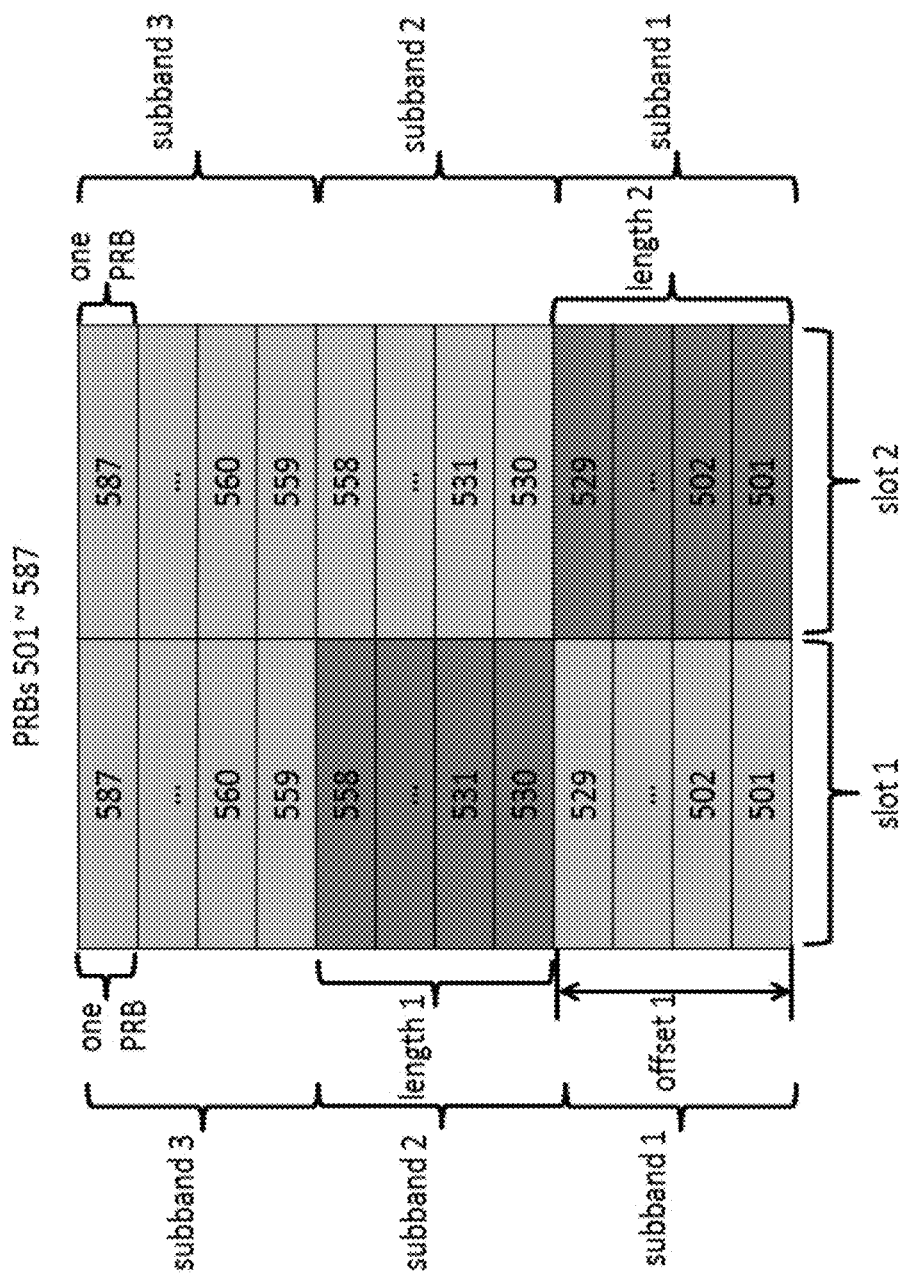
FIG. 5 illustrates a further exemplary IoT subband deployment in accordance with some embodiments of the present application.

FIG. 5 illustrates a further exemplary IoT subband deployment in accordance with some embodiments of the present application. The embodiments of FIG. 5 provide information indicating non-available PRB based on pattern(s). Similar to embodiments of FIG. 3, a wideband carrier in embodiments of FIG. 5 is partitioned into more than one subbands. According to the embodiments of FIG. 5, 87 PRBs of a wideband carrier are partitioned into 3 subbands, for example, subband 1 includes PRBs 501~529, subband 2 includes PRBs 530~558, and subband 3 includes PRBs 559~587.

In particular, for a 5 MHz bandwidth and a 15 kHz subcarrier spacing, two PRBs are necessary as guard band on each side of a NR IoT subband; and if only one carrier of 5 MHz bandwidth is used by a NR IoT application in a given slot on a wideband carrier, 29 PRBs in total (25 PRBs as listed in Table 5.3.2-1 of TS38.101+4 PRBs in guard bands) are not available for eMBB/URLLC transmission. For a 10 MHz bandwidth and a 30 kHz subcarrier spacing, two PRBs are also necessary as guard band on each side of a NR IoT subband; and if only one 10 MHz bandwidth carrier is used by NR IoT application in a given slot on a wideband carrier, 28 PRBs in total (24 PRBs as listed in Table 5.3.2-1 of TS38.101+4 PRBs in guard bands) are not available for eMBB/URLLC transmission.

In some embodiments of the present application, considering the frequency hopping for NR IoT carrier bandwidth from one carrier bandwidth to another carrier bandwidth, multiple patterns are predefined based on the possible IoT carrier bandwidth locations. For example, assuming the wideband carrier can be partitioned into N subbands, with each subband equal to one NR IoT carrier bandwidth, NR IoT carrier can hop among the N subbands.

In some embodiments of the present application, RRC signaling is used to configure multiple patterns for an eMBB/URLLC UE, and each of the multiple patterns defines a subband specifically reserved for NR IoT application. Both RRC signaling and/or DCI may be applied in these embodiments. For instance, a field in the DCI is used to indicate the current NR IoT pattern to the eMBB/URLLC UE. The field may be included in the DCI for scheduling PDSCH, the DCI for scheduling PUSCH, or group-common PDCCH. The field in the DCI may be used to indicate an index of the current NR IoT pattern within the predefined patterns. When more than one NR IoT carrier bandwidths are deployed in a wideband carrier, some patterns can be configured to indicate more than one subband specifically reserved for NR IoT application. Contents of each pattern may be further configured by RRC signaling.

More specifically, the subbands for NR IoT application in the embodiments of FIG. 5 adopt a 5 MHz bandwidth with a 15 kHz subcarrier spacing. As shown in FIG. 5, both subband 2 in slot 1 and subband 1 in slot 2 are used by NR IoT application. According to the embodiments as described above, RRC signaling can configures 3 patterns corresponding to subbands 1-3, respectively, wherein pattern 1 indicates only subband 1 is reserved for NR IoT, pattern 2 indicates only subband 2 is reserved for NR IoT, pattern 3 indicates only subband 3 is reserved for NR IoT. A field in a DCI may include a pattern index to indicate which subband is used for NR IoT application, e.g., index of pattern 2 indicating subband 2 in slot 1 is reserved for NR IoT and/or an index of pattern 1 indicating subband 1 in slot 2 is reserved for NR IoT.

Specific contents and manners of each pattern within N subbands are described as follows. In some embodiments, each pattern is defined as a starting PRB index of and a concrete number of the contiguous PRBs reserved for NR IoT application (i.e., non-available contiguous PRBs for eMBB/URLLC UE). In some additional embodiments, each pattern is defined as a PRB-based bitmap, wherein each bit in the bitmap corresponds to one PRB of the carrier and indicates whether the PRB is available or not-available for transmission.

For example, regarding the preconfigured patterns corresponding to subbands 1-3 in FIG. 5, pattern 2 corresponds to 29 contiguous PRBs of subband 2 in slot 1 (i.e., PRB 530 to PRB 558 as shown in FIG. 5) which are non-available for a eMBB/URLLC UE. Pattern 2 may define a starting PRB index (i.e., PRB 530 as shown in FIG. 5) of the non-available contiguous PRBs in subband 2. Pattern 2 may also define a length of 29 PRBs (i.e., length 1 as shown in FIG. 5), to indicate a concrete number of the non-available contiguous PRBs (i.e., 29 PRBs) in subband 2. Similarly, pattern 1 corresponds to 29 contiguous PRBs of subband 1 in slot 2 (i.e., PRB 501 to PRB 529) which are non-available for the eMBB/URLLC UE.

In some embodiments of the present application, at least one pattern of the predefined patterns is used to indicate that none of the resources in a given slot on a carrier are reserved for the NR IoT application. That is, all the resource are used by eMBB/URLLC application.

Figure 6A:
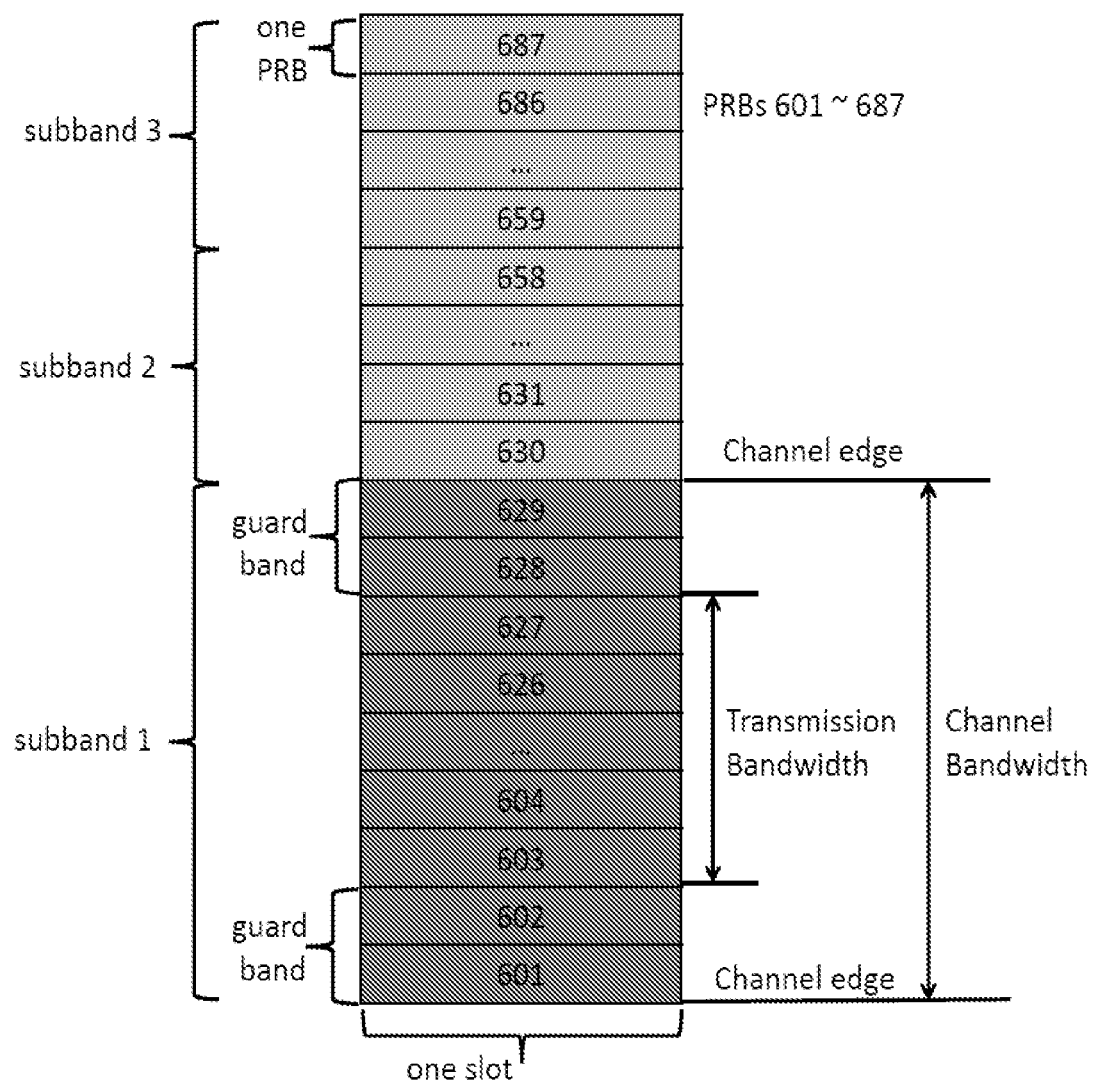
FIG. 6A illustrates an additional exemplary IoT subband deployment in accordance with some embodiments of the present application.

FIG. 6A illustrates an additional exemplary IoT subband deployment in accordance with some embodiments of the present application that implement PRB-based guard band indication. According to FIG. 6A, a wideband carrier within one slot are partitioned into 87 PRBs, i.e., PRBs 601~687, wherein subband 1 includes PRBs 601~629, subband 2 includes PRBs 630~658, and subband 3 includes PRBs 659~687.

More specifically, as shown in FIG. 6A, subband 1 is used by NR IoT application, wherein PRBs 601~629 included in subband 1 are named as Channel Bandwidth, with two channel edges are marked clearly in FIG. 6A and two PRBs reserved as guard bands on each side of subband 1 (i.e., PRBs 601~602 and PRBs 628~629 as shown in FIG. 6A). PRBs 603~627 represent Transmission Bandwidth and used to transmit data of the NR IoT application.

Figure 6B:
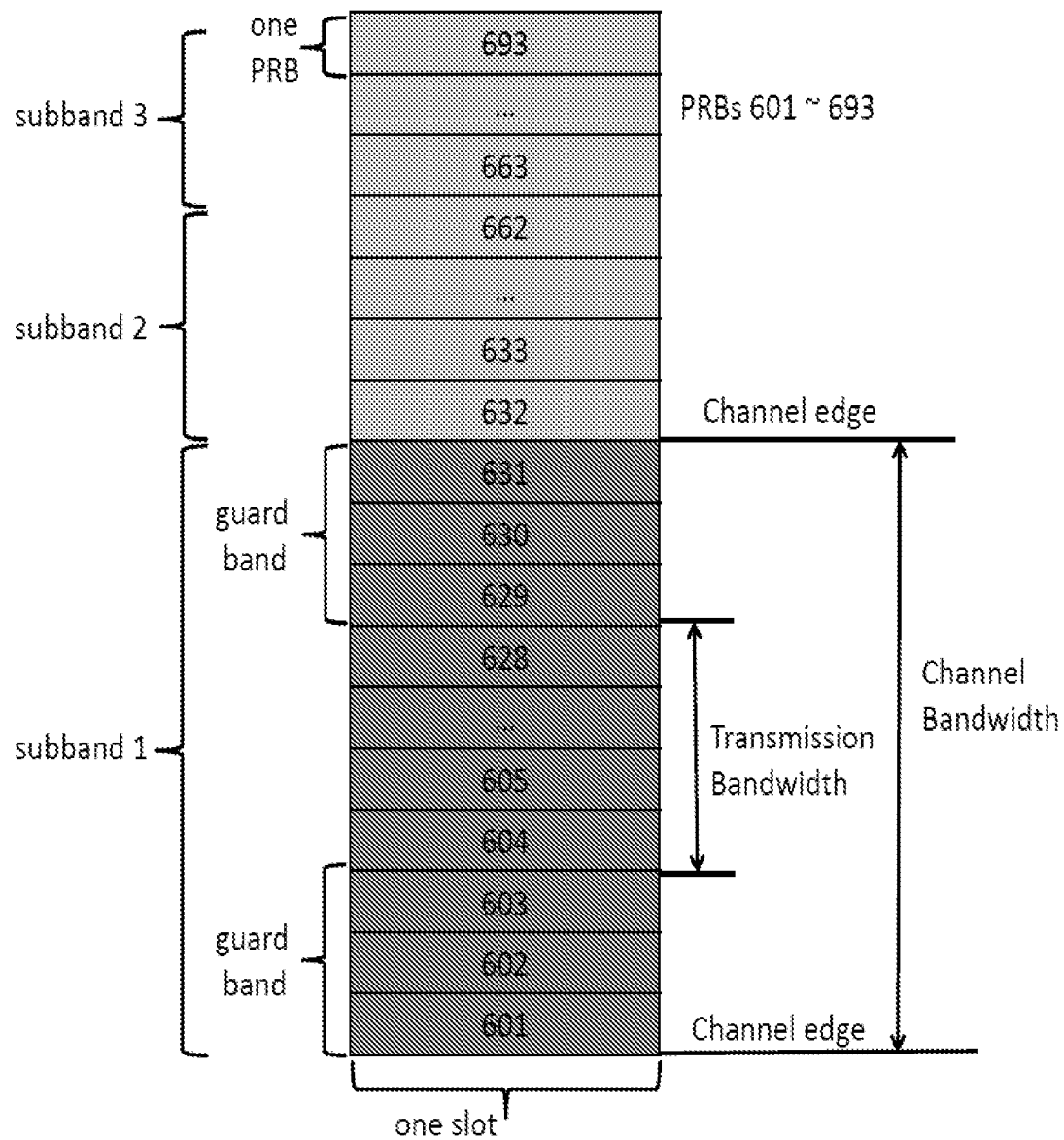
FIG. 6B illustrates a further exemplary IoT subband deployment in accordance with some embodiments of the present application.

FIG. 6B illustrates a further exemplary IoT subband deployment in accordance with some embodiments of the present application. The embodiments of FIG. 6B shows similar implementing manners to the embodiments of FIG. 6A. According to embodiments of FIG. 6B, a wideband carrier within one slot are partitioned into 93 PRBs, i.e., PRBs 601~693, wherein subband 1 includes PRBs 601~631, subband 2 includes PRBs 632~662, and subband 3 includes PRBs 663~693.

More specifically, as shown in FIG. 6B, subband 1 is used by NR IoT application, wherein PRBs 601~631 included in subband 1 are named as Channel Bandwidth with two channel edges identified. FIG. 6B shows three PRBs reserved as guard band on each side of subband 1 (i.e., PRBs 601~603 and PRBs 629~631 as shown in FIG. 6B) and identifies PRBs 604~628 as Transmission Bandwidth used to transmit data of the NR IoT application.

The embodiments of FIGS. 6A and 6B assume that a NR IoT bandwidth is the minimum bandwidth covering the NR SSB, e.g., a 5 MHz bandwidth for SSB using a 15 kHz subcarrier spacing and no frequency hopping is allowed from one 5 MHz bandwidth to another. In some embodiments, the NR IoT carrier is always located in the minimum bandwidth covering SS/PBCH block (i.e., the cell-defining SSB) for initial access. In some other embodiments, a frequency offset is needed to indicate an offset between an edge of a wideband carrier and an edge reserved for a NR IoT subband. RRC signaling may be used to indicate such frequency offset. In response to a frequency offset of the NR IoT subband being indicated to a eMBB/URLLC UE, based on knowing the minimum bandwidth (e.g., a 5 MHz bandwidth for SSB using a 15 kHz subcarrier spacing) which is used by the NR IoT subband, the eMBB/URLLC UE may know a concrete location of the NR IoT subband.

In some embodiments, RRC signaling indicates a frequency offset between the lowest-numbered PRB of a synchronization signal/Physical broadcast channel (SS/PBCH) block and the lowest-numbered PRB of a frequency bandwidth reserved for NR IoT application. After receiving the RRC signaling, eMBB/URLLC UE may determine a concrete location of a subband reserved for NR IoT application.

In some embodiments of the present application, a new field is introduced in DCI (e.g., a DCI for scheduling PDSCH, a DCI for scheduling PUSCH, or a group-common PDCCH) for indicating to the eMBB/URLLC UE a concrete number of reserved PRBs for guard band usage. For a 5 MHz bandwidth and a 15 kHz subcarrier spacing, two PRBs are necessary as guard band on each side of a NR IoT subband. For a 10 MHz bandwidth and a 30 kHz subcarrier spacing, two PRBs are also necessary as guard band on each side of a NR IoT subband. Hence, two bits are enough to indicate a concrete number of reserved PRBs on each side of the NR IoT subband for guard band usage.

For instance, "00" in DCI indicates that no PRB is reserved in a NR IoT subband whereas all assigned PRBs for the eMBB/URLLC UE are available for DL or UL transmission; "01" in DCI indicates that there is one PRB reserved on each side of the NR IoT subband; "10" in DCI indicates that there are two PRBs reserved on each side of the NR IoT subband; and "11" in DCI indicates that there are three PRBs reserved on each side of the NR IoT subband.

In some embodiments of the present application, a subcarrier spacing of the NR IoT subband is indicated to a eMBB/URLLC UE. In this way, the eMBB/URLLC UE knows a concrete number of PRBs reserved as guard band for the NR IoT subband. In some other embodiments of the present application, RRC signaling is used to indicate a concrete number of PRBs of non-available PRBs by RIV.

In some embodiments of the present application, one bit in a DCI (e.g., a DCI for scheduling PDSCH, a DCI for scheduling PUSCH, or a group-common PDCCH) is used to indicate to the eMBB/URLLC UE whether a guard band for NR IoT subband exists or not.

In some embodiments of the present application, for DL transmission, the eMBB/URLLC UE assumes that rate matching is performed around the non-available PRBs, and for UL transmission, the eMBB/URLLC UE performs rate-matching around the non-available PRBs. Alternatively, puncturing data on the reserved PRBs by the eMBB/URLLC UE is also feasible. In some embodiments of the present application, for DL transmission, the eMBB/URLLC UE assumes that data on the non-available PRBs is punctured; and for UL transmission, the eMBB/URLLC UE punctures data on the non-available PRBs. Using all these embodiments, network resources can be fully reused.

Figure 7:
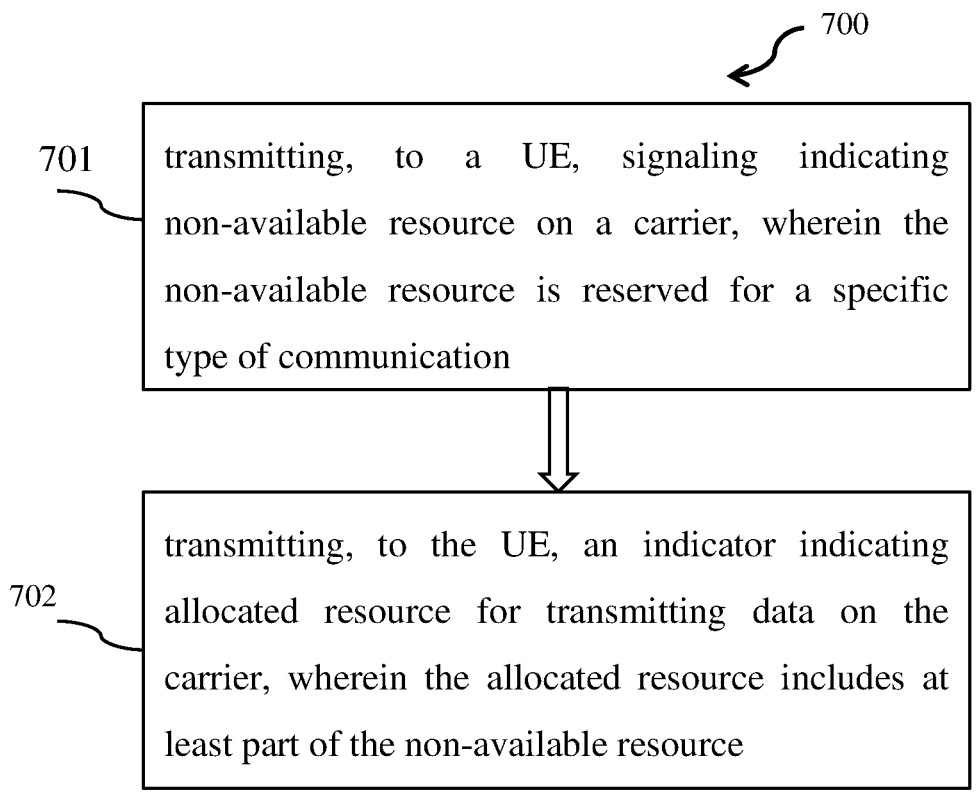
FIG. 7 illustrates a flow chart of a method for wireless communications in accordance with some embodiments of the present application.

FIG. 7 illustrates a flow chart of a method for wireless communications in accordance with some embodiments of the present application. In the exemplary method 700 as shown in FIG. 7, in operation 701, a BS (e.g., BS 102 as shown in FIG. 1) transmits, to a UE (e.g., UE 101a as shown in FIG. 1), signaling indicating non-available resource on a carrier, wherein the non-available resource is reserved for a specific type of communication. In one example, the specific type of communication is machine type communication (MTC).

In operation 702, the BS transmits, to the UE, an indicator indicating allocated resource for transmitting data on the carrier, wherein the allocated resource includes at least part of the non-available resource.

For instance, according to the embodiments of FIG. 7, a gNB transmits, to an eMBB/URLLC UE, signaling indicating that one subband is non-available resource on a carrier. The subband is reserved for NR IoT application. Besides, the gNB transmits, to the eMBB/URLLC UE, an indicator indicating allocated resource for transmitting data on the carrier. The allocated resource for the eMBB/URLLC UE has one or more PRBs overlapped with the subband. Thus, the gNB may transmit data to the eMBB/URLLC UE on the remaining resource.

More specifically, in one example, a gNB transmits, to an eMBB/URLLC UE, DCI indicating that one subband is non-available resource on a carrier. The subband is reserved for NR IoT application. Furthermore, the gNB transmits, to the eMBB/URLLC UE, an indicator indicating allocated resource for transmitting data on the carrier. The allocated resource for the eMBB/URLLC UE has one or more PRBs overlapped with the subband. Thus, the gNB may receive data from the eMBB/URLLC UE on the remaining resource.

In some embodiments of the present application, in the exemplary method 700, the BS further receives, from the UE, data on the remaining of the allocated resource except the at least part of the non-available resource.

In some embodiments of the present application, in the exemplary method 700, the BS further transmits, to the UE data on the remaining of the allocated resource except the at least part of the non-available resource.

In some embodiments of the present application, in the exemplary method 700, the BS further transmits, to the UE, RRC signaling for configuring bandwidth and subcarrier spacing of a subband.

Details described in all the foregoing embodiments of the present application (for example, how to allocate resource for wideband carrier, how to improve channel utilization efficiency, and how to avoid potential interference between eMBB/URLLC and IoT applications) are applicable for the embodiments as shown in FIG. 7.

Figure 8:
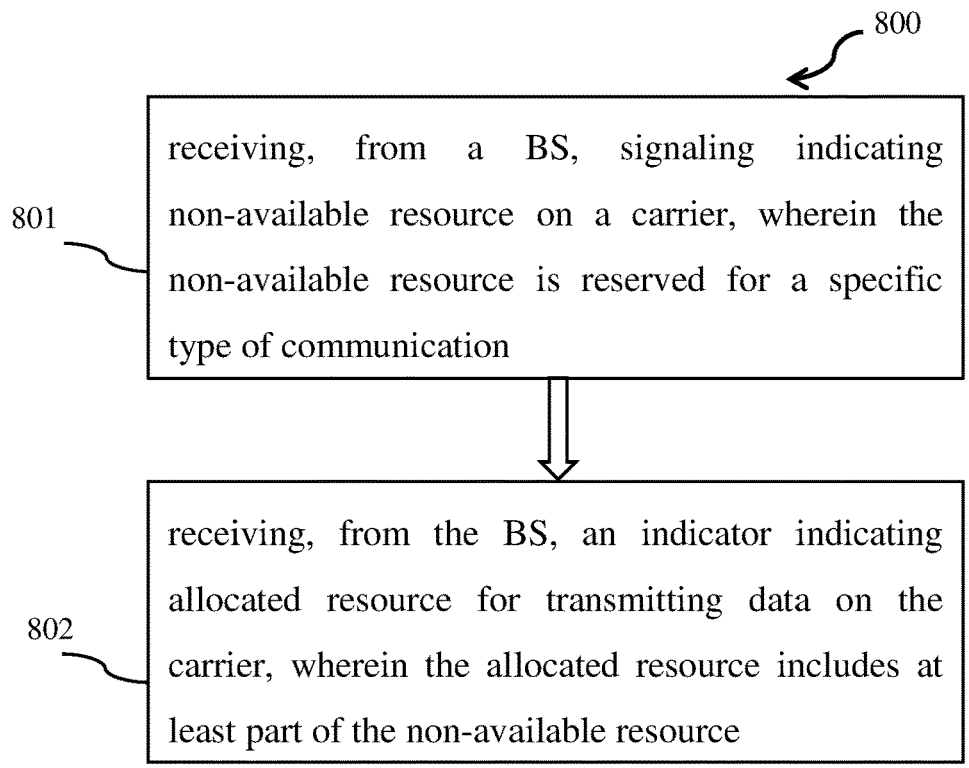
FIG. 8 illustrates another flow chart of a method for wireless communications in accordance with some embodiments of the present application.

FIG. 8 illustrates another flow chart of a method for wireless communications in accordance with some embodiments of the present application. In the exemplary method 800 as shown in FIG. 8, in operation 801, a UE (e.g., UE 101a as shown in FIG. 1) receives, from a BS (e.g., BS 102 as shown in FIG. 1), signaling indicating non-available resource on a carrier, wherein the non-available resource is reserved for a specific type of communication. In one example, the specific type of communication is MTC.

In operation 802, the UE receives, from the BS, an indicator indicating allocated resource for transmitting data on the carrier, wherein the allocated resource includes at least part of the non-available resource.

For instance, according to the embodiments of FIG. 8, an eMBB/URLLC UE receives, from a gNB, signaling indicating that one subband is non-available resource on a carrier. The subband is reserved for NR IoT application. Besides, the eMBB/URLLC UE receives, from the gNB, an indicator indicating allocated resource for transmitting data on the carrier. The allocated resource for the eMBB/URLLC UE has one or more PRBs overlapped with the subband. Thus, the eMBB/URLLC UE may receive data from the gNB on the remaining resource.

More specifically, in one example, a eMBB/URLLC UE receives, from a gNB, DCI indicating that one subband is non-available resource on a carrier. The subband is reserved for NR IoT application. Furthermore, the eMBB/URLLC UE receives, from the gNB, an indicator indicating allocated resource for transmitting data on the carrier. The allocated resource for the eMBB/URLLC UE has one or more PRBs overlapped with the subband. Thus, the eMBB/URLLC UE may transmit data to the gNB on the remaining resource.

In some embodiments of the present application, in the exemplary method 800, the UE further transmits, to the BS, data on the remaining of the allocated resource except the at least part of the non-available resource.

In some embodiments of the present application, in the exemplary method 800, the UE further receives, from the BS, data on the remaining of the allocated resource except the at least part of the non-available resource.

In some embodiments of the present application, in the exemplary method 800, the UE further receives, from the BS, RRC signaling for configuring bandwidth and subcarrier spacing of a subband.

Details described in all the foregoing embodiments of the present application (for example, how to allocate resource for wideband carrier, how to improve channel utilization efficiency, and how to avoid potential interference between eMBB/URLLC and IoT applications) are applicable for the embodiments as shown in FIG. 8.

Figure 9:
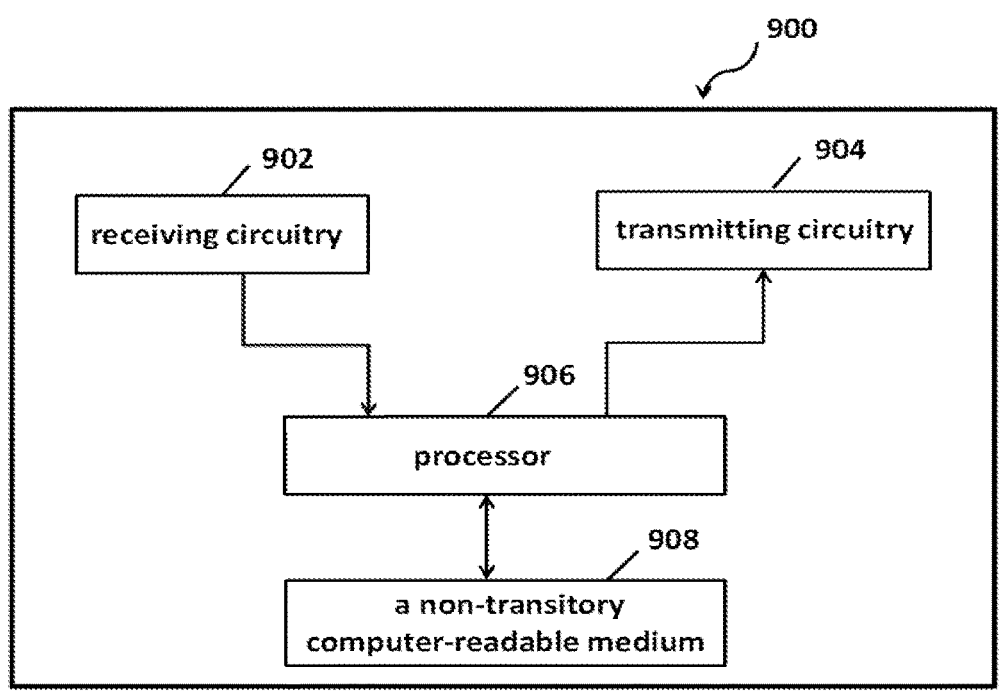
FIG. 9 illustrates a block diagram of an exemplary apparatus in accordance with some embodiments of the present application.

FIG. 9 illustrates a block diagram of an exemplary apparatus in accordance with some embodiments of the present application. Referring to FIG. 9, the apparatus 900 includes a non-transitory computer-readable medium 908, a receiving circuitry 902, a transmitting circuitry 904, and a processor 906. The processor 906 is coupled to the non-transitory computer-readable medium 908, the receiving circuitry 902, and the transmitting circuitry 904.

It is contemplated that some components are omitted in FIG. 9 for simplicity. In some embodiments, the receiving circuitry 902 and the transmitting circuitry 904 may be integrated into a single component (e.g., a transceiver).

In some embodiments, the non-transitory computer-readable medium 908 may have stored thereon computer-executable instructions to cause a processor to implement the operations with respect to UE(s) as described above. For example, the computer-executable instructions may be executed to cause the processor 906 to control the receiving circuitry 902 and transmitting circuitry 904 to perform the operations with respect to UE(s) as described and illustrated with respect to FIGS. 1-8.

In some embodiments, the non-transitory computer-readable medium 908 may have stored thereon computer-executable instructions to cause a processor to implement the operations with respect to BS(s) as described above. For example, the computer-executable instructions may be executed to cause the processor 906 to control the receiving circuitry 902 and transmitting circuitry 904 to perform the operations with respect to BS(s) as described and illustrated with respect to FIGS. 1-8.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method for wireless communications performed by a base station, the method comprising:
    transmitting, to a user equipment (UE), signaling indicating a non-available resource associated with a carrier, wherein the non-available resource is reserved for a type of wireless communication; and
    transmitting, to the UE, an indicator indicating an allocated resource for a data transmission on the carrier, wherein the allocated resource includes at least part of the non-available resource, wherein the carrier is partitioned into a plurality of subbands, each subband of the plurality of subbands has a same bandwidth and a same subcarrier spacing, the signaling includes a bitmap, and each bit in the bitmap corresponds to a respective subband of the plurality of subbands and indicates whether the respective subband is available.

2. The method of claim 1, wherein the signaling is at least one of radio resource control (RRC) signaling or downlink control information (DCI), wherein the DCI is at least one of DCI scheduling physical downlink shared channel (PDSCH), DCI scheduling physical uplink shared channel (PUSCH), or a group-common physical downlink control channel (PDCCH).

3. The method of claim 1, wherein:
    the signaling includes an index and the index corresponds to a corresponding subband reserved for the type of wireless communication; or
    the signaling includes a state to indicate that each of the plurality of subbands are available.

4. The method of claim 1, further comprising:
    transmitting, to the UE, RRC signaling for configuring a bandwidth and a subcarrier spacing of a subband, wherein a number of physical resource blocks (PRBs) reserved as a guard band on each side of the subband reserved for the type of wireless communication is based on the bandwidth and the subcarrier spacing.

5. The method of claim 1, wherein the signaling indicates a set of contiguous physical resource blocks (PRBs) associated with the carrier as non-available.

6. The method of claim 5, wherein:
    the signaling includes a downlink control information (DCI) and indicates both a starting PRB index and a number of PRBs in the set of contiguous PRBs;
    the signaling includes radio resource control (RRC) signaling and indicates a number of PRBs of the set of contiguous PRBs, and the signaling further includes the DCI and further indicates a starting PRB index of the number of PRBs of the set of contiguous PRBs;
    the signaling includes radio resource control (RRC) signaling and indicates both a starting PRB index and a number of PRBs of the set of contiguous PRBs; or
    the signaling includes radio resource control (RRC) signaling and indicates a frequency offset between a lowest PRB of a synchronization signal and/or physical broadcast channel (SS/PBCH) block and a lowest PRB of a frequency bandwidth reserved for the type of wireless communication.

7. The method of claim 5, wherein the signaling indicates a resource reservation pattern from a set of preconfigured resource reservation patterns.

8. The method of claim 7, wherein:
    each of the set of preconfigured resource reservation patterns defines a starting PRB index and a number of contiguous PRBs reserved for the type of wireless communication;
    each of the set of preconfigured resource reservation patterns defines a bitmap and each bit in the bitmap corresponds to one PRB of the carrier and indicates whether the PRB is available or not-available for transmission; or
    at least one resource reservation pattern of the set of preconfigured resource reservation patterns indicates that no resource in a given slot on the carrier is reserved for the type of wireless communication.

9. The method of claim 5, wherein the signaling includes radio resource control (RRC) signaling and indicates a frequency offset between an edge of the carrier and an edge of a frequency bandwidth reserved for the type of wireless communication.

10. The method of claim 9, wherein:
    the signaling further includes a DCI to indicate a number of reserved PRBs in a guard band of the frequency bandwidth; or
    the signaling further includes one bit in a DCI to indicate whether a guard band for the type of wireless communication exists.

11. The method of claim 1, wherein the non-available resource includes a minimum bandwidth covering a synchronization signal (SS)/physical broadcast channel (PBCH) block for initial access.

12. A base station, comprising:
at least one memory; and
at least one processor coupled with the at least one memory and configured to cause the base station to:
transmit, to a user equipment (UE), signaling indicating a non-available resource associated with a carrier, wherein the non-available resource is reserved for a type of wireless communication; and
transmit, to the UE, an indicator indicating an allocated resource for a data transmission on the carrier, wherein the allocated resource includes at least part of the non-available resource, wherein the carrier is partitioned into a plurality of subbands, each subband of the plurality of subbands has a same bandwidth and a same subcarrier spacing, the signaling includes a bitmap, and each bit in the bitmap corresponds to a respective subband of the plurality of subbands and indicates whether the respective subband is available.

13. A user equipment (UE), comprising:
at least one memory; and
at least one processor coupled with the at least one memory and configured to cause the UE to:
receive, from a base station, signaling indicating a non-available resource associated with a carrier, wherein the non-available resource is reserved for a type of wireless communication; and
receive, from the base station, an indicator indicating an allocated resource for a data transmission on the carrier, wherein the allocated resource includes at least part of the non-available resource, wherein the carrier is partitioned into a plurality of subbands, each subband of the plurality of subbands has a same bandwidth and a same subcarrier spacing, the signaling includes a bitmap, and each bit in the bitmap corresponds to a respective subband of the plurality of subbands and indicates whether the respective subband is available.

14. The UE of claim 13, wherein the signaling is at least one of radio resource control (RRC) signaling or downlink control information (DCI), wherein the DCI is at least one of a DCI scheduling physical downlink shared channel (PDSCH), a DCI scheduling physical uplink shared channel (PUSCH), and a group-common physical downlink control channel (PDCCH).

15. The UE of claim 13, further comprising: receiving, from the base station, RRC signaling for configuring a bandwidth and a subcarrier spacing of a subband.

16. The UE of claim 13, wherein the signaling indicates a set of contiguous physical resource blocks (PRBs) associated with the carrier as non-available, or indicates a resource reservation pattern from a set of preconfigured resource reservation patterns.

17. The UE of claim 16, wherein the signaling includes radio resource control (RRC) signaling and indicates a frequency offset between an edge of the carrier and an edge of a frequency bandwidth reserved for the type of communication.

18. The UE of claim 16, wherein the signaling includes a radio resource control (RRC) signaling and indicates a frequency offset between the lowest PRB of a synchronization signal and/or physical broadcast channel (SS/PBCH) block and the lowest PRB of a frequency bandwidth reserved for the type of wireless communication.

19. A method at a user equipment (UE), the method comprising:
receiving, from a base station, signaling indicating a non-available resource associated with a carrier, wherein the non-available resource is reserved for a type of wireless communication; and
receive, from the base station, an indicator indicating an allocated resource for a data transmission on the carrier, wherein the allocated resource includes at least part of the non-available resource, wherein the carrier is partitioned into a plurality of subbands, each subband of the plurality of subbands has a same bandwidth and a same subcarrier spacing, the signaling includes a bitmap, and each bit in the bitmap corresponds to a respective subband of the plurality of subbands and indicates whether the respective subband is available.

* * * * *